US006931753B2

(12) United States Patent
Ryals et al.

(10) Patent No.: US 6,931,753 B2
(45) Date of Patent: Aug. 23, 2005

(54) END ASSEMBLY FOR TAPE RULE (75) Inventors: Steven Ryals, Pinson, AL (US); Frederick Diggle, Birmingham, AL (US); Wilson Ryals, Trussville, AL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 10/759,495

(22) Filed: Jan. 16, 2004

(65) Prior Publication Data
US 2005/0155244 A1 Jul. 21, 2005

(51) Int. Cl.[7] .................................................. G01B 3/10
(52) U.S. Cl. ............................ 33/758; 33/755; 33/770
(58) Field of Search .......................... 33/755–758, 770

(56) References Cited

U.S. PATENT DOCUMENTS

| | | | | |
|---|---|---|---|---|
| 338,410 A | * | 3/1886 | Herline | 33/758 |
| 654,960 A | * | 7/1900 | Elskamp | 33/758 |
| 841,272 A | | 1/1907 | Read | |
| 1,623,138 A | | 4/1927 | Swift | |
| 1,646,826 A | * | 10/1927 | Langsner | 33/758 |
| 1,798,476 A | | 3/1931 | Langsner | |
| 1,860,635 A | | 5/1932 | Thompson | |
| 2,629,934 A | | 3/1953 | Scott | |
| 3,016,617 A | | 1/1962 | Bricker | |
| 3,601,896 A | | 8/1971 | Ledene | |
| 3,611,576 A | | 10/1971 | Quenot | |
| 3,913,232 A | | 10/1975 | Marcell | |
| 3,913,233 A | | 10/1975 | Marcell | |
| 3,965,579 A | * | 6/1976 | Woods | 33/770 |
| 4,466,194 A | | 8/1984 | Rutty | |
| 4,527,334 A | * | 7/1985 | Jones et al. | 33/761 |
| 5,010,657 A | * | 4/1991 | Knapp | 33/770 |
| 5,212,875 A | * | 5/1993 | Corso | 33/414 |
| 5,600,894 A | | 2/1997 | Blackman | |
| 5,659,970 A | * | 8/1997 | Reedy | 33/758 |
| 6,082,014 A | * | 7/2000 | Beyers | 33/414 |
| 6,101,734 A | | 8/2000 | TenCaat | |
| 6,108,926 A | | 8/2000 | Fraser | |
| 6,370,790 B1 | * | 4/2002 | Stenger | 33/758 |
| 6,442,863 B1 | * | 9/2002 | Poineau et al. | 33/758 |
| 6,637,126 B2 | * | 10/2003 | Balota | 33/770 |
| 6,698,679 B1 | * | 3/2004 | Critelli et al. | 242/395 |
| 2002/0073569 A1 | * | 6/2002 | Simmons | 33/758 |

\* cited by examiner

*Primary Examiner*—Christopher W. Fulton
*Assistant Examiner*—Yaritza Guadalupe
(74) *Attorney, Agent, or Firm*—Walters & Zimmerman; Geoff Butcliffe; Jennifer Medlin (57) ABSTRACT

An end assembly for a tape rule is disclosed. This end assembly has a hooking member for attachment to a free end of the tape rule. The hooking member includes a plate section, an elbow section, and an abutment section. The plate section is for longitudinal alignment along the free end of the tape rule. The elbow section upwardly curves from the plate section to the abutment section. The abutment section downwardly curves to a substantially perpendicular orientation to the plate section, and the abutment section downwardly extends below the tape rule. The hooking member is positioned to an article to be measured, and the abutment section contacts and frictionally engages an edge of the article.

14 Claims, 8 Drawing Sheets

FIG. 8

END ASSEMBLY FOR TAPE RULE

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but the copyright owner otherwise reserves all copyrights whatsoever.

BACKGROUND OF THE INVENTION

1. Field of the Invention

This invention generally relates to geometrical instruments and, more particularly, to flexible tapes for measuring distances.

2. Description of the Related Art

"One person operation" of a tape rule is often frustrating. When a single user tries to measure an article using a tape rule, the user hooks one end of the tape rule to an end the article. The user then extends the tape rule along the article for a length dimension. As so often happens, however, the tape rule slips from the article. The user must walk back to the end of the article, recoil/rewind the tape rule, and attempt another measurement. It's not uncommon to try several times before an accurate measurement is obtained. It's also not uncommon to enlist the help of another person when using the tape rule. There is, accordingly, a need for an improved tape rule, a need for a tape rule that reduces slippage from the article to be measured, and a need for a tape rule that allows one person operation.

BRIEF SUMMARY OF THE INVENTION

The aforementioned problems are reduced by an end assembly for a tape rule. This end assembly includes improvements and features that reduce slippage from the article to be measured. These improvements and features permit a single person to make accurate measurements using the tape rule. These improvements and features may also be selectively chosen to suit the article to be measured. The end assembly of this invention, then, is applicable to many different articles and measurement situations.

One embodiment of this invention describes an end assembly for a tape rule. This end assembly has a hooking member for attachment to a free end of the tape rule. The hooking member includes a plate section, an elbow section, and an abutment section. The plate section is for longitudinal alignment along the free end of the tape rule. The elbow section upwardly curves from the plate section to the abutment section. The abutment section downwardly curves to a substantially perpendicular orientation to the plate section, and the abutment section downwardly extends below the tape rule. The hooking member is positioned to an article to be measured, and the abutment section contacts and frictionally engages an edge of the article.

BRIEF DESCRIPTION OF THE SEVERAL VIEWS OF THE DRAWINGS

These and other features, aspects, and advantages of this invention are better understood when the following Detailed Description of the Invention is read with reference to the accompanying drawings, wherein.

DETAILED DESCRIPTION OF THE INVENTION

This invention now will be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

This invention is an end assembly for a tape rule. This end assembly includes improvements and features that reduce slippage from an article to be measured. These improvements and features permit a single person to make accurate measurements using the tape rule. These improvements and features may also be selectively chosen to suit the article to be measured. The end assembly of this invention, then, is applicable to many different articles and measurement situations.

Figure 1:
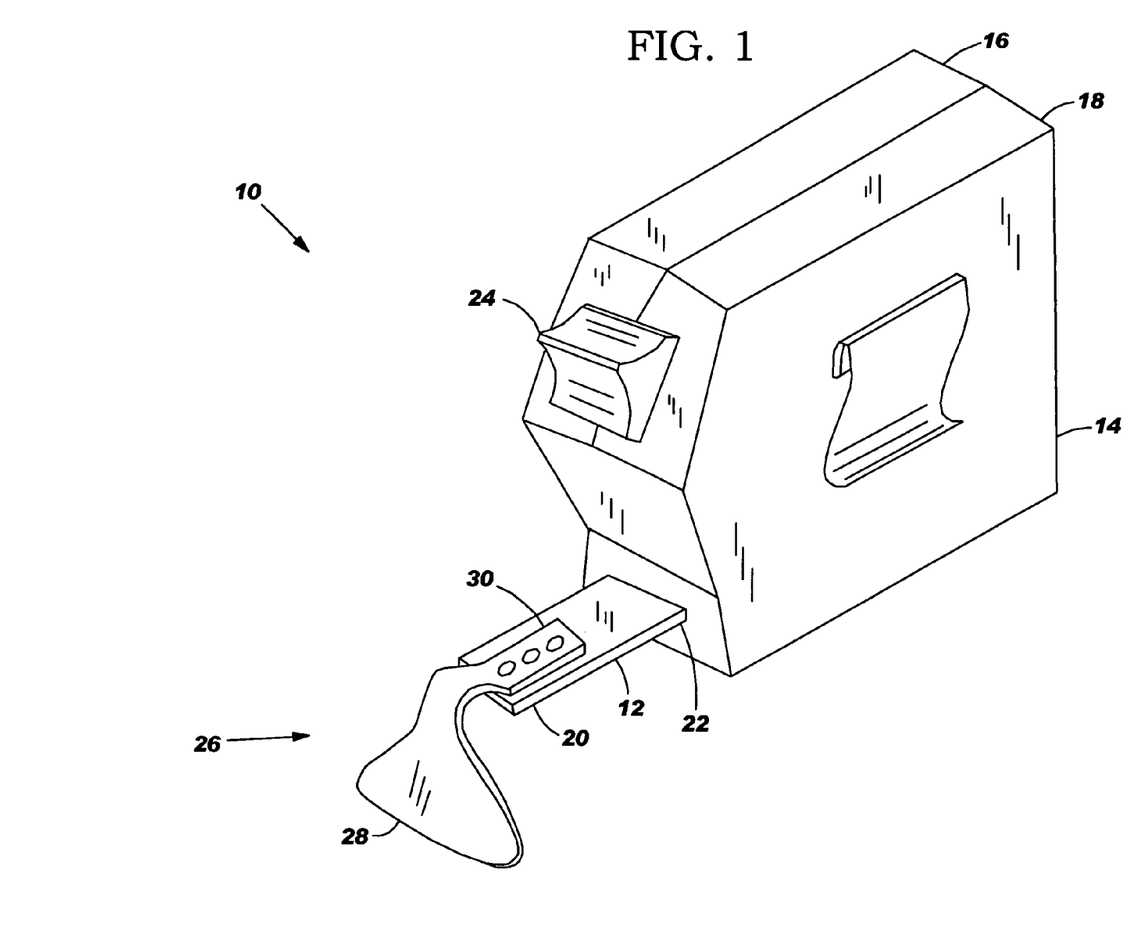
FIG. 1 is a schematic illustrating a conventional tape measure.

FIG. 1 is a schematic illustrating a conventional tape measure 10. The tape measure 10 includes a flexible tape rule 12 spooled within a housing 14. The housing 14 has separable halves 16 and 18 that enclose a winding return spring (not shown for simplicity). One end of the tape rule 12 anchors to the return spring. A free end 20 of the tape rule 12 outwardly projects through an opening 22 in the housing 14. The tape rule 12 can be pulled from within the housing 14 to a desired length. A thumb slide 24 operates a frictional brake (not shown for simplicity) to maintain the tape rule 12 at the desired length. Because the tape measure 10 is conventional and well-known to those of ordinary skill in the art, this patent will not further describe the componentry and the operation of the tape measure 10.

The tape rule 12 includes an end assembly 26. The end assembly 26 includes a hooking member 28. The end assembly 26 also includes means for attaching the hooking member 28 to the free end 20 of the tape rule 12. When the tape rule 12 is used to measure an article (not shown), the hooking member 28 is positioned to the article and frictionally engages an edge of the article. The means for attaching the hooking member 28 to the tape rule 12 is shown as one or more rivets 30. The means for attaching the hooking member 28 to the tape rule 12, however, may additionally or alternatively include a threaded fastener, a clamp, an adhesive, a weld, a magnet, threads, and a fabric hook and loop fastener. The means for attaching the hooking member 28 to the tape rule 12 may also include polymer molding techniques, such as injection molding.

Figure 2:
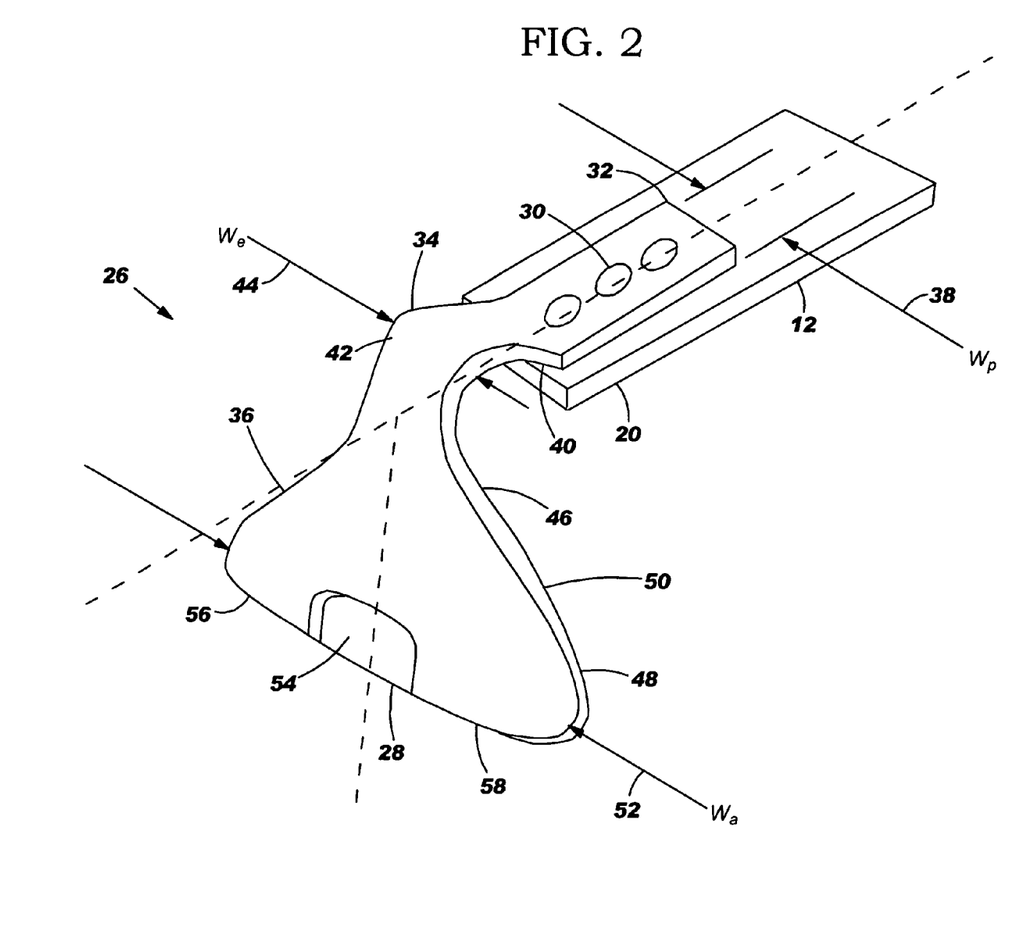
FIGS. 2–7 are schematics illustrating an end assembly shown in FIG. 1, according to the embodiments of this invention.
Figure 3:
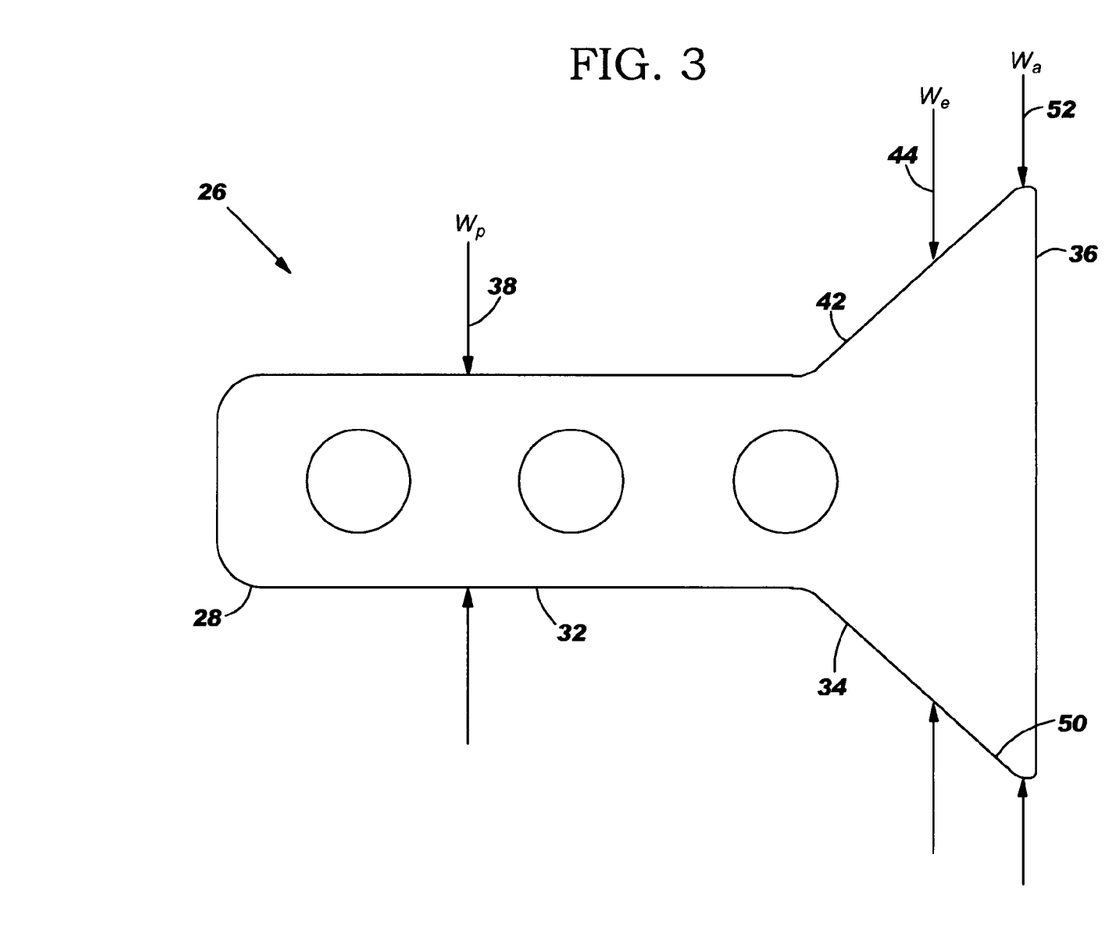

FIGS. 2–7 are schematics illustrating the end assembly 26 shown in FIG. 1. FIG. 2 is an isometric view of the end assembly 26. FIGS. 3–7 are, respectively, top, side, bottom, and end orthographic views of the end assembly 26. The end assembly 26 is shown enlarged for clarity. The hooking member 28 is formed of a single piece of material and comprises a plate section 32, an elbow section 34, and an abutment section 36. The plate section 32 longitudinally aligns along the free end 20 of the tape rule 12. The plate section 32 also has a width $w_p$ (shown as reference numeral 38). The elbow section 34 upwardly curves (shown as reference numeral 40) from the plate section 32 to the abutment section 36. The elbow section 34 also outwardly flares (shown as reference numeral 42) to a width $w_e$ (shown as reference numeral 44) exceeding the width $w_p$ of the plate section 32. The abutment section 36 then downwardly curves (shown as reference numeral 46) to a substantially perpendicular orientation (shown as reference numeral 48) to the plate section 32. The abutment section 36 downwardly extends below the tape rule 12 and outwardly flares (shown as reference numeral 50) to a width $w_a$ (shown as reference numeral 52) exceeding the width $w_e$ of the elbow section 34.

The end assembly 26 may also include an open-ended notch 54. The open-ended notch 54 upwardly extends from a lower edge 56 of the abutment section 36. The open-ended notch 54 slides over/onto a corner edge of the article to be measured. The open-ended notch 54 thus helps prevent the end assembly 26 from slipping from the corner edge. The lower edge 56 of the abutment section 36 may be arcuately-shaped (shown as reference numeral 58) to provide additional clearance between the end assembly 26 and the corner edge of the article to be measured.

Figure 4:
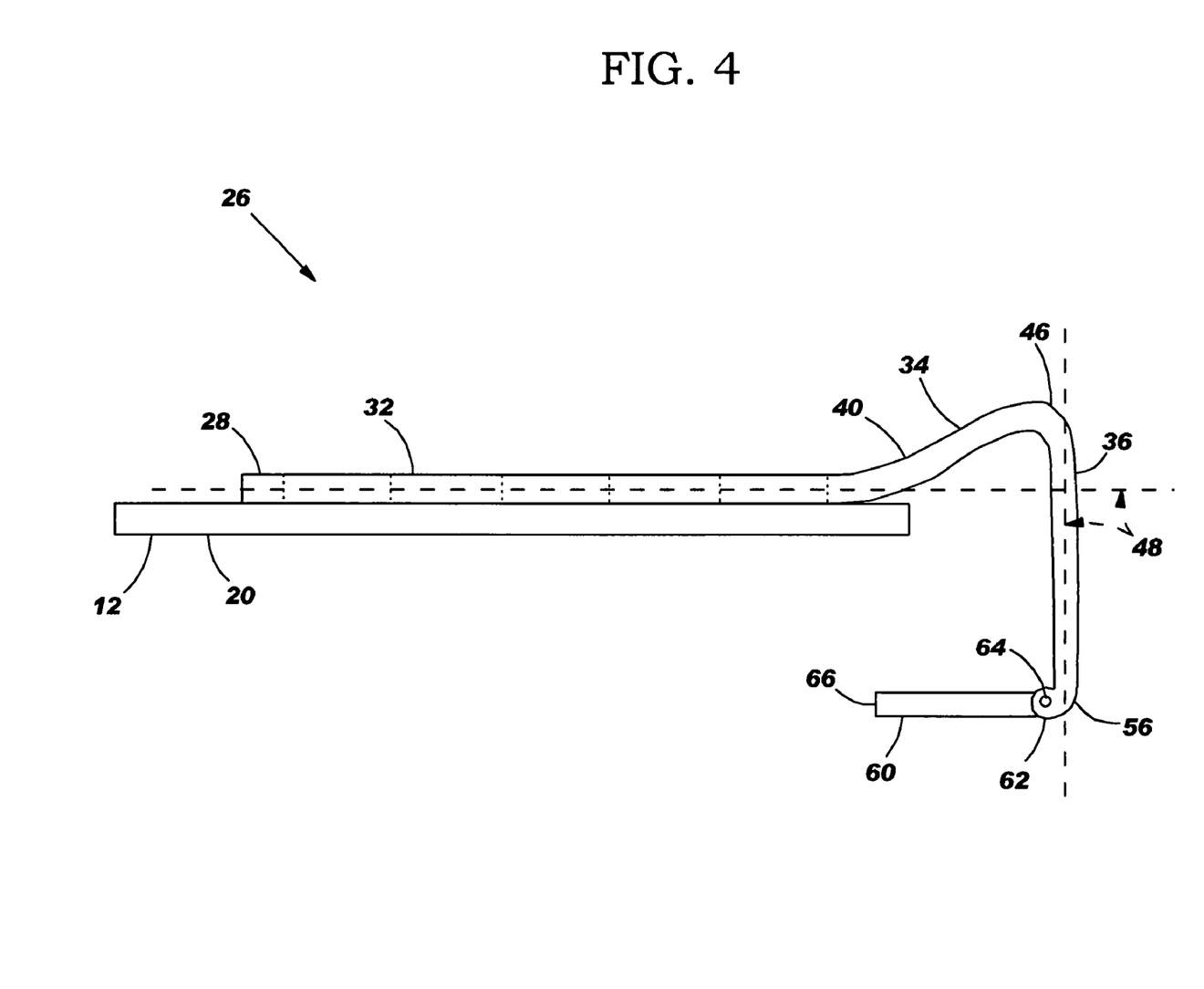
Figure 5:
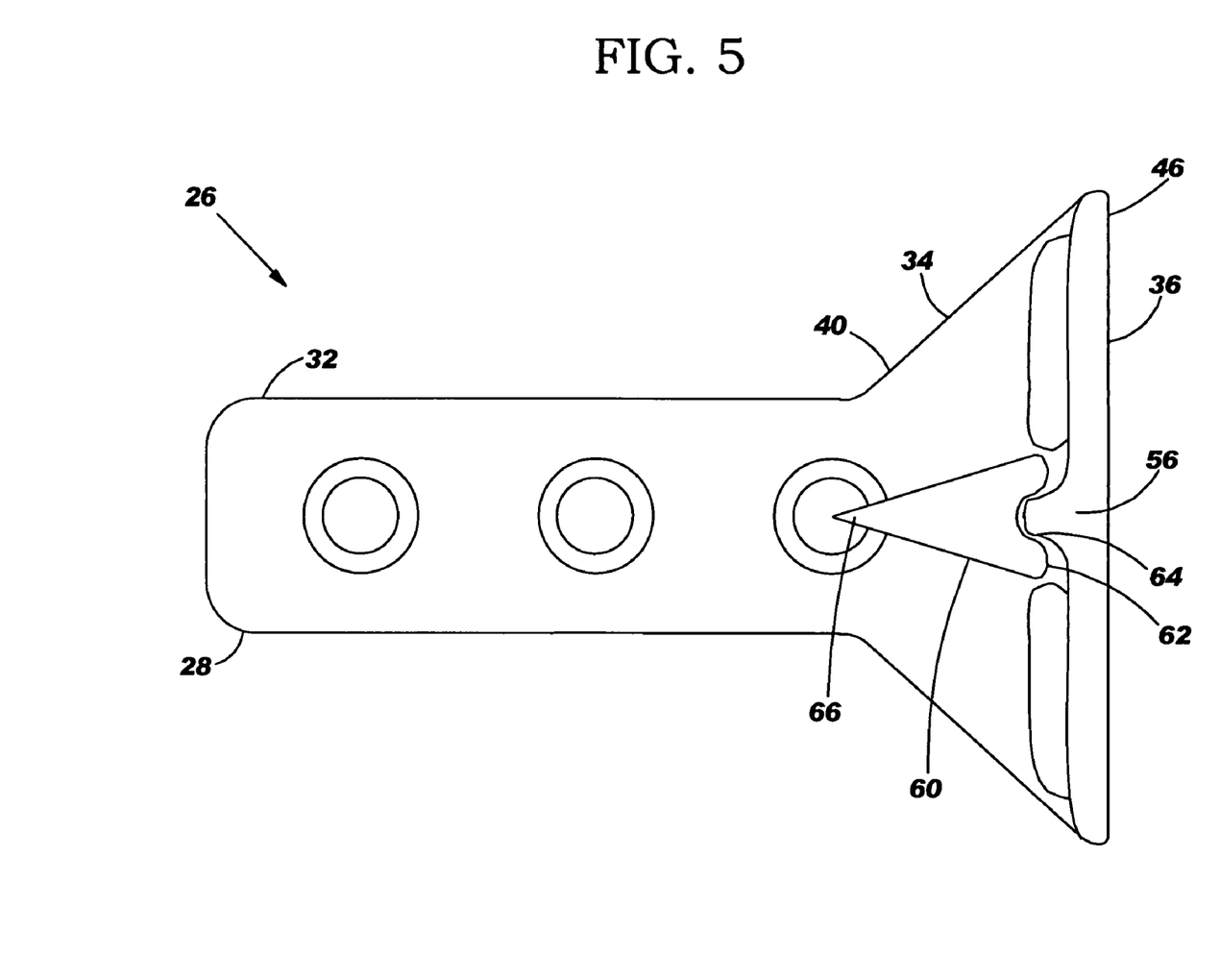
Figure 6:
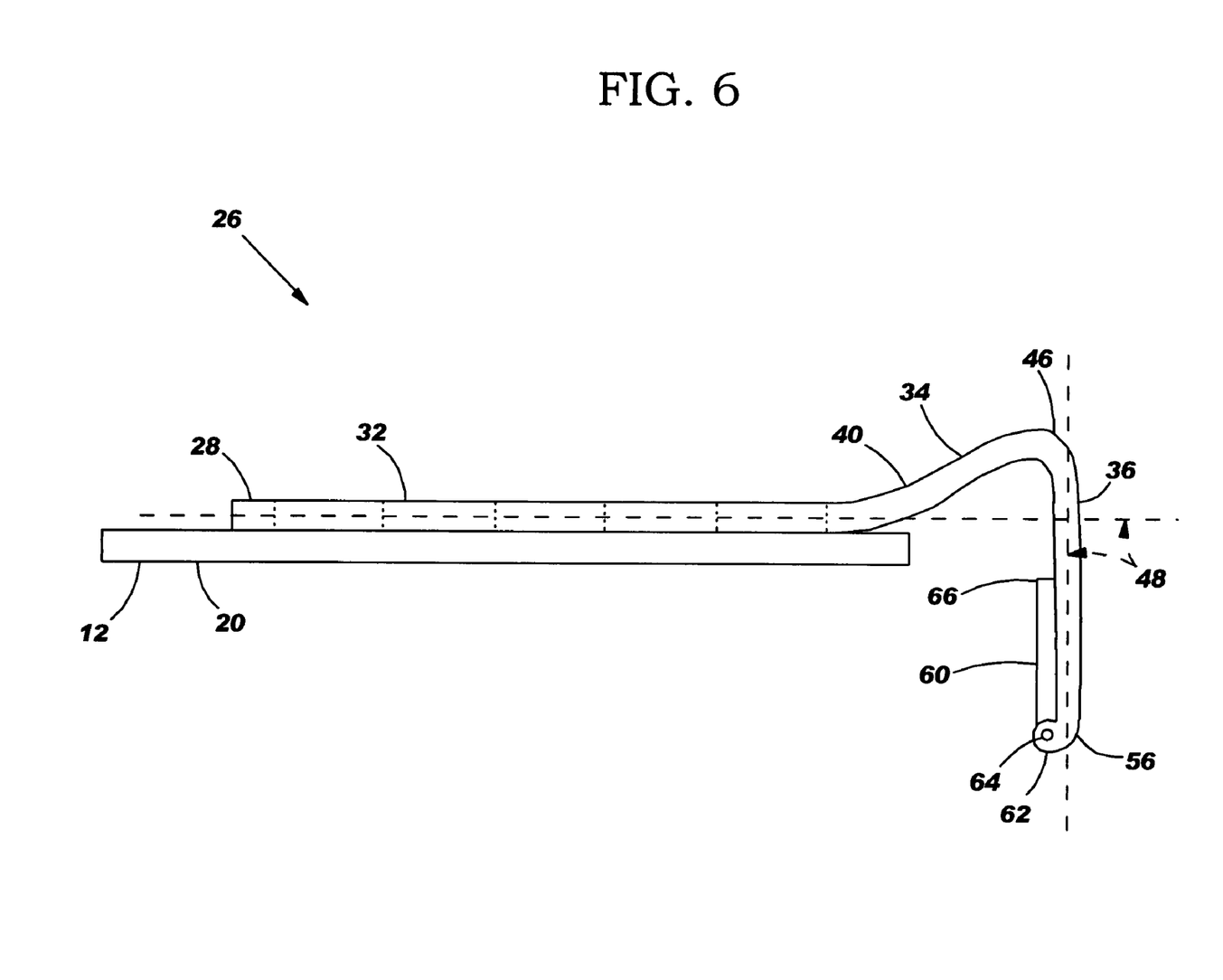
Figure 7:
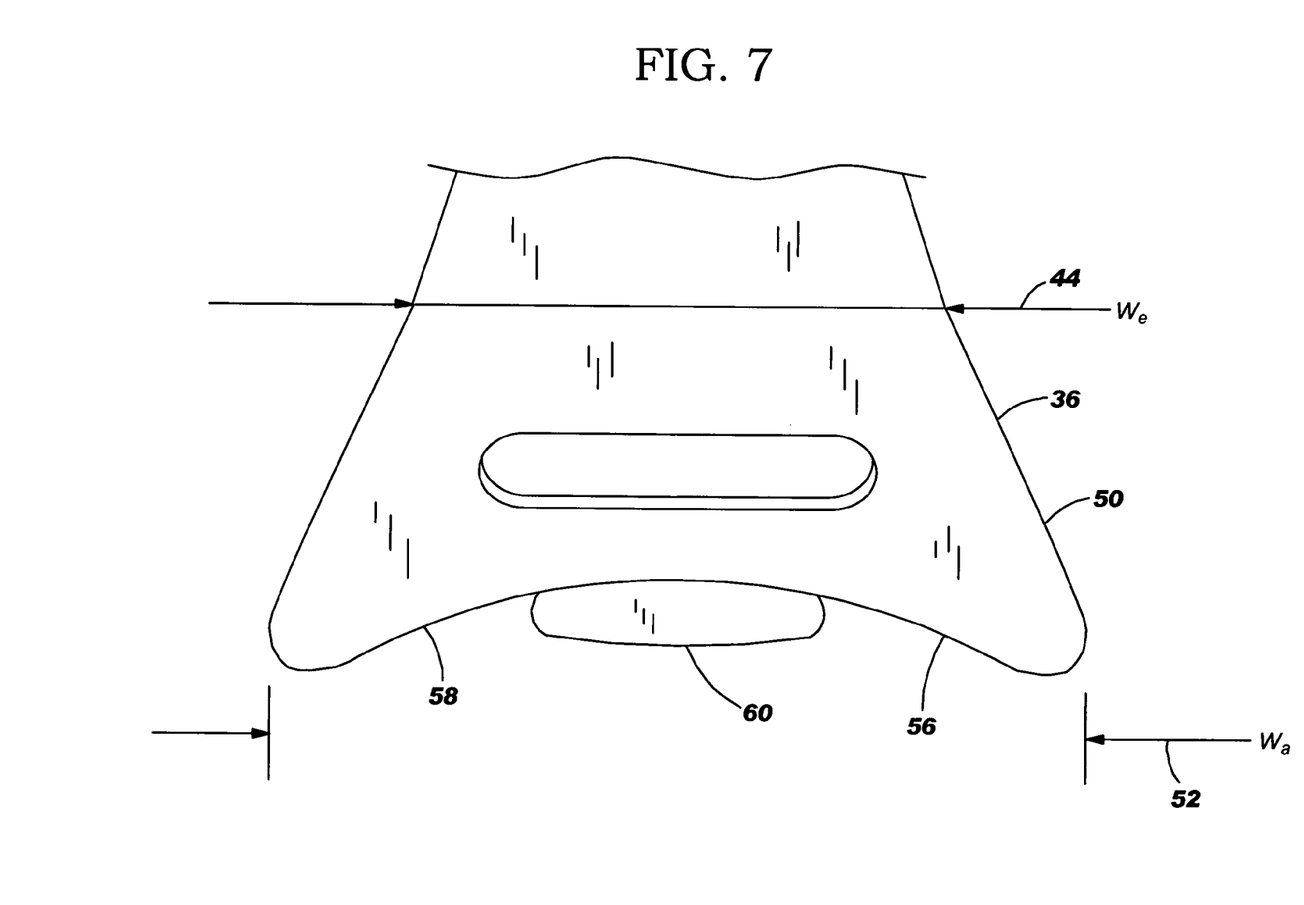

FIGS. 4–7 are orthographic views of the end assembly 26. Here the end assembly 26 may include a hinged flap 60. FIGS. 4 and 5 are, respectively, side and bottom views showing this hinged flap 60 rotated to penetrate the article to be measured. FIG. 6 is another side view showing the hinged flap 60 in a stowed position. FIG. 7 is an end view of the end assembly 26. At least a portion of the lower edge 56 of the abutment section 36 is rolled to a substantially cylindrical shape (shown as reference numeral 62). The flap 60 hinges to the abutment section 36, and the flap 60 hinges about a pin 64 inserted through the rolled lower edge 56 and 62 of the abutment section 36. The flap 60 comprises a pointed tooth 66 for penetrating the article to be measured.

Figure 8:
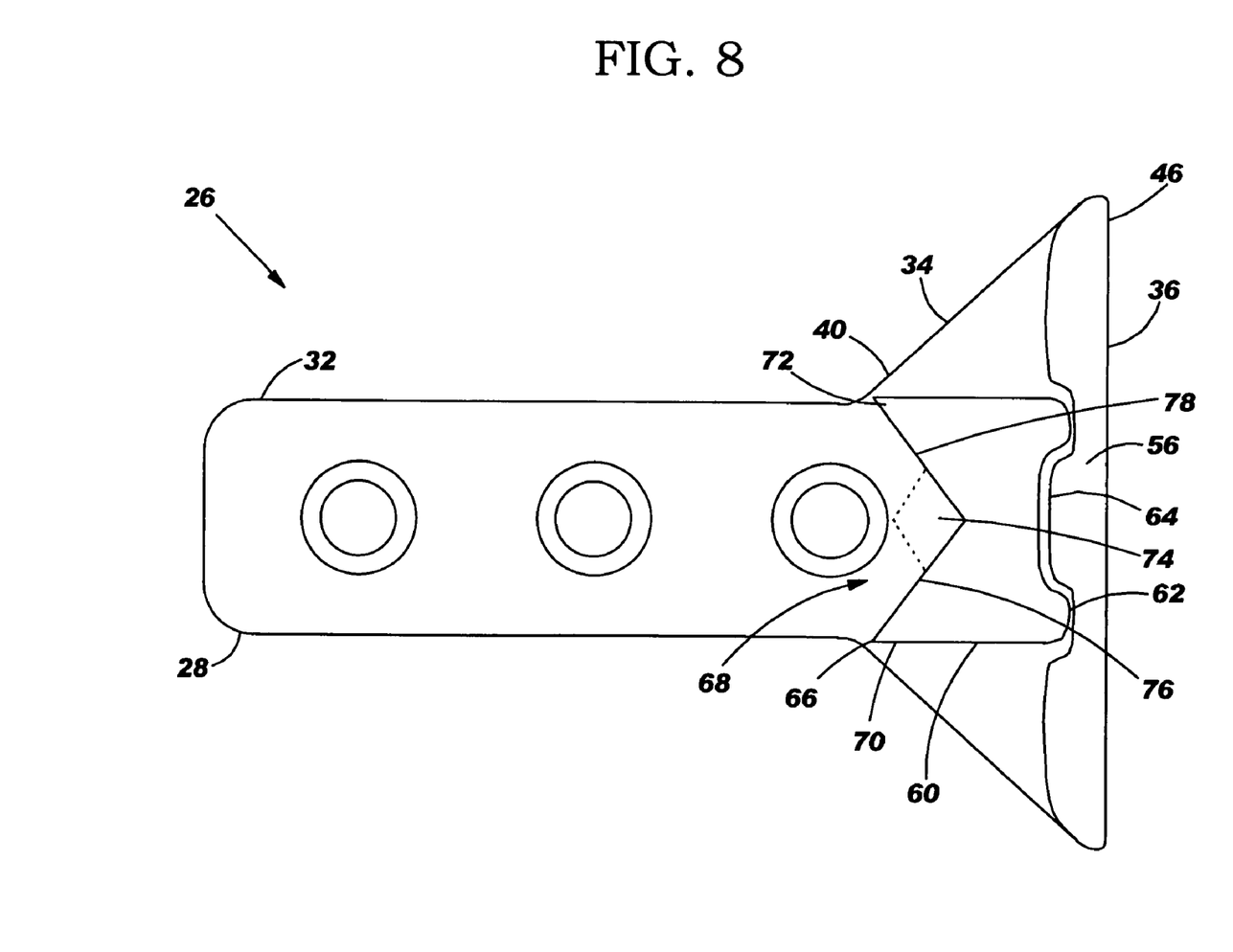
FIG. 8 is a schematic illustrating a hinged flap, according to the embodiments of this invention.

FIG. 8 is a schematic further illustrating the hinged flap 60. The flap 60 may also comprise a two-sided notch 68 inwardly extending from an edge 70 of the flap 60. The two-sided notch 68 forms at least two teeth 66 and 72 for penetrating the article to be measured. The two-sided notch 68 comprises a substantially right angle 74 between a first side 76 and a second side 78 of the notch 68.

The improvements and features of this invention can be selectively chosen by the user. The user can choose whether the open-ended notch 54 and/or the hinged flap 60 is best suited to retain the end assembly 26 to the article. Because the open-ended notch 54 slides over/onto a corner edge of the article to be measured, the open-ended notch 54 helps reduce slippage. Because the hinged flap 60 may comprise the pointed teeth 66 and 72, the hinged flap 60 can penetrate the article to be measured and reduce slippage. These improvements and features permit a single person to make accurate measurements using the tape rule 12. These improvements and features may also be selectively chosen to suit the article to be measured. The end assembly 26 of this invention, then, is applicable to many different articles and measurement situations.

The hooking member 28 is formed of a single piece of material. This single piece of material is formed to create the plate section 32, the elbow section 34, and the abutment section 36. The hooking member 28, for example, may be formed of a metallic compound, such as cold-rolled steel, metal spring stock, aluminum, and/or any other metallic compound. The hooking member 28, however, may also be formed of a plastic/polymer compound.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. An end assembly for a tape rule, comprising:
   a hooking member for attachment to a free end of the tape rule,
   the hooking member comprising a plate section, an elbow section, and an abutment section, the plate section for longitudinal alignment along the free end of the tape rule, the elbow section upwardly curving from the plate section to the abutment section, the elbow section outwardly flaring to a width exceeding a width of the plate section, the abutment section downwardly curving to a substantially perpendicular orientation to the plate section, and the abutment section downwardly extending below the tape rule,
   wherein the hooking member is positioned to an article to be measured, and the abutment section contacts and frictionally engages an edge of the article.

2. An end assembly according to claim 1, further comprising means for attaching the hooking member to the tape rule.

3. An end assembly according to claim 1, further comprising an open-ended notch in the abutment section, the open-ended notch upwardly extending from a lower edge of the abutment section.

4. An end assembly according to claim 1, wherein the abutment section has an arcuately-shaped lower edge.

5. An end assembly for a tape rule, comprising:
   a hooking member for attachment to a free end of the tape rule,
   the hooking member comprising a plate section, an elbow section, and an abutment section, the plate section for longitudinal alignment along the free end of the tape rule, the elbow section upwardly curving from the plate section to the abutment section, the abutment section downwardly curving to a substantially perpendicular orientation to the plate section, the abutment section downwardly extending below the tape rule, and the abutment section outwardly flaring to a width exceeding a width of the elbow section,
   wherein the hooking member is positioned to an article to be measured, and the abutment section contacts and frictionally engages an edge of the article.

6. An end assembly according to claim 5, further comprising means for attaching the hooking member to the tape rule.

7. An end assembly according to claim 5, further comprising an open-ended notch in the abutment section, the open-ended notch upwardly extending from a lower edge of the abutment section.

8. An end assembly for a tape rule, comprising:
   a hooking member for attachment to a free end of the tape rule,
   the hooking member comprising a plate section, an elbow section, and an abutment section, the plate section for longitudinal alignment along the free end of the tape rule, the elbow section upwardly curving from the plate section to the abutment section, the abutment section downwardly curving to a substantially perpendicular orientation to the plate section, the abutment section downwardly extending below the tape rule, and at least a portion of a lower edge of the abutment section rolled to a substantially cylindrical shape, wherein the hooking member is positioned to an article to be measured, and the abutment section contacts and frictionally engages an edge of the article.

9. An end assembly according to claim 8, further comprising a flap hinged to the abutment section, the flap hinging about a pin inserted through the rolled lower edge of the abutment section.

10. An end assembly according to claim 9, wherein the flap comprises a pointed tooth for penetrating the article to be measured.

11. An end assembly according to claim 9, wherein the flap comprises a two-sided notch inwardly extending from an edge of the flap, the two-sided notch forming at least two teeth for penetrating the article to be measured.

12. An end assembly according to claim 11, wherein the two-sided notch comprises a substantially right angle between a first side and a second side.

13. An end assembly according to claim 8, further comprising means for attaching the hooking member to the tape rule.

14. An end assembly according to claim 8, further comprising an open-ended notch in the abutment section, the open-ended notch upwardly extending from a lower edge of the abutment section.

* * * * *